(12) United States Patent
Blume et al.

(10) Patent No.: US 6,684,568 B2
(45) Date of Patent: Feb. 3, 2004

(54) DOOR PANEL ASSEMBLY

(75) Inventors: Klaus B. W. Blume, Nauheim (DE); Damien Cabanne, Fontainbleau (FR); Pascal DeVries, Sandillion (FR); Simon Dobson, Folkestone (GB); Charles B. Hopson, Lebanon, TN (US); Herve Laurandel, St. Claire (FR); Mark G. Lawrie, Lion en Sulias (FR); Yaun le Gallo, Orleans (FR)

(73) Assignee: Meritor Light Vehicle Systems—France, Sully sur Loire (FR)

( * ) Notice: Subject to any disclaimer, the term of this patent is extended or adjusted under 35 U.S.C. 154(b) by 88 days.

(21) Appl. No.: 09/802,106

(22) Filed: Mar. 8, 2001

(65) Prior Publication Data

US 2002/0040554 A1 Apr. 11, 2002

Related U.S. Application Data

(60) Provisional application No. 60/188,973, filed on Mar. 10, 2000.

(30) Foreign Application Priority Data

Oct. 3, 2000 (GB) .............................................. 0024104

(51) Int. Cl.$^7$ .............................. E05F 15/08; B60J 1/08
(52) U.S. Cl. ...................... 49/349; 296/146.1; 411/351; 49/502
(58) Field of Search .......................... 49/502, 375, 358, 49/352, 348, 349, 350, 351; 296/146.1, 146.5; 403/408.1, 274, 279, 280, 282; 411/351, 356, 338, 508, 913, 171, 360.1

(56) References Cited

U.S. PATENT DOCUMENTS

| | | | | |
|---|---|---|---|---|
| 1,858,070 A | * | 5/1932 | Ackerman | 49/352 X |
| 2,381,365 A | * | 8/1945 | Parsons | 49/352 X |
| 3,281,991 A | * | 11/1966 | Colell | 49/352 |
| 3,771,410 A | * | 11/1973 | Swindt, II | 411/338 |
| 4,229,906 A | * | 10/1980 | Pickles | 49/352 |
| 4,310,273 A | * | 1/1982 | Kirrish | 411/338 |
| 4,503,732 A | * | 3/1985 | Schust | 49/352 X |
| 4,770,056 A | * | 9/1988 | Becker et al. | 49/352 X |
| 4,848,032 A | * | 7/1989 | Ballor et al. | 49/375 X |
| 4,943,109 A | * | 7/1990 | Skrbina et al. | 296/146.5 X |
| 4,964,238 A | * | 10/1990 | Nishijima et al. | 49/352 |
| 4,998,332 A | * | 3/1991 | Dacey, Jr. | 29/90.01 |
| 5,011,356 A | * | 4/1991 | Fernandez | 411/508 X |
| 5,230,137 A | * | 7/1993 | Abe | 403/408.1 X |
| 5,335,411 A | * | 8/1994 | Muller et al. | 403/282 X |

(List continued on next page.)

FOREIGN PATENT DOCUMENTS

| | | | | |
|---|---|---|---|---|
| DE | 3737733 | * | 5/1988 | 49/352 |
| DE | 3930106 | * | 3/1991 | 49/352 |
| DE | 19755899 A1 | | 6/1999 | |
| DE | 19619087 A1 | | 11/2000 | |
| EP | 0 451 019 A1 | | 10/1991 | |
| EP | 0663535 A | | 7/1995 | |
| EP | 0 811 516 A2 | | 12/1997 | |
| EP | 0 892 724 B1 | | 11/2000 | |
| GB | 597795 A | | 2/1948 | |
| GB | 2 222 847 A | | 3/1990 | |
| JP | 119236 | | 5/2001 | |

*Primary Examiner*—Hugh B. Thompson
(74) *Attorney, Agent, or Firm*—Carlson, Gaskey & Olds

(57) ABSTRACT

A door panel assembly includes a panel with a window regulator mounted on one side and a power mechanism mounted on an opposite side. The panel has a first alignment feature for aligning the window regulator relative to the panel and a second alignment feature for aligning the power mechanism relative to the panel. The first and second alignment features facilitate alignment of the window regulator and the power mechanism to each other. Further, the first and second alignment features allow initial assembly of one of the window regulator or power mechanism components to the panel with a subsequent assembly of the remaining component to the panel without having to hold the first component in place.

9 Claims, 1 Drawing Sheet

U.S. PATENT DOCUMENTS

| | | | |
|---|---|---|---|
| 5,425,206 A | | 5/1995 | Compeau |
| 5,651,634 A | * | 7/1997 | Kraus ...................... 403/408.1 |
| 5,694,719 A | * | 12/1997 | Bejune et al. ................ 49/502 |
| 5,729,930 A | * | 3/1998 | Schust et al. ................. 49/375 |
| 5,832,667 A | * | 11/1998 | Buening et al. .......... 49/352 X |
| 6,152,646 A | | 11/2000 | Muller-Blech |
| 6,164,684 A | * | 12/2000 | Lehman ............... 403/408.1 X |
| 6,185,873 B1 | * | 2/2001 | Saito .......................... 49/502 |
| 6,264,393 B1 | * | 7/2001 | Kraus ........................ 403/282 |
| 6,305,129 B1 | * | 10/2001 | Eckhardt et al. .............. 49/502 |

\* cited by examiner

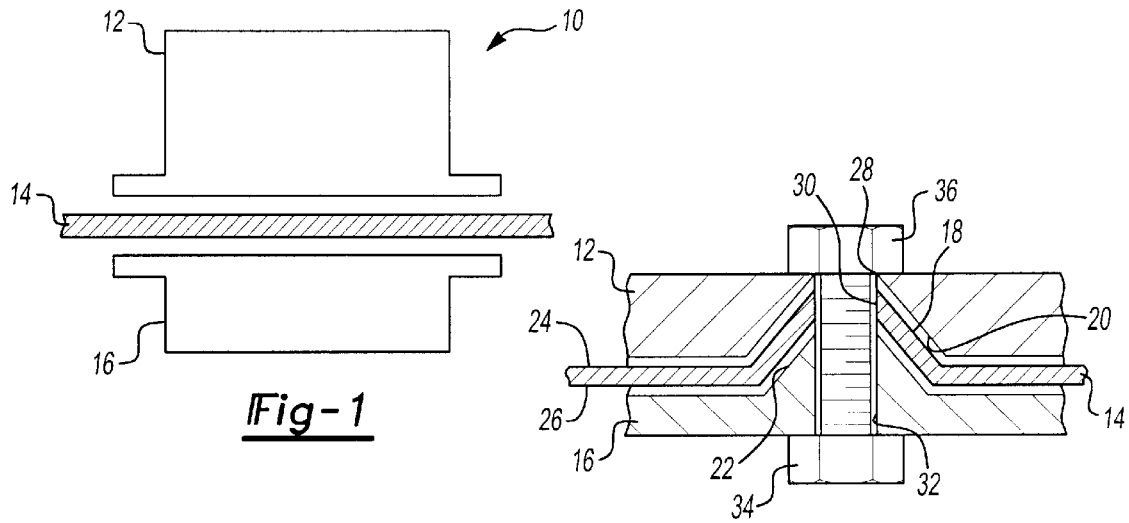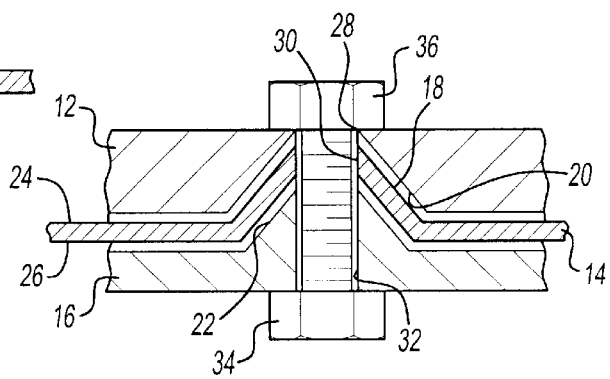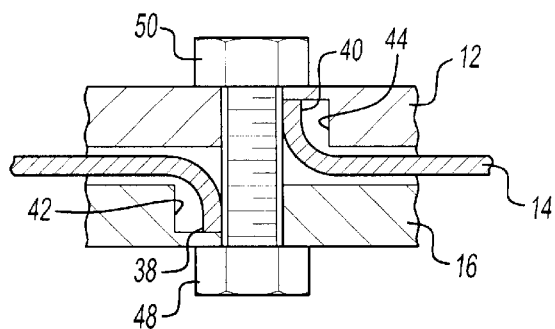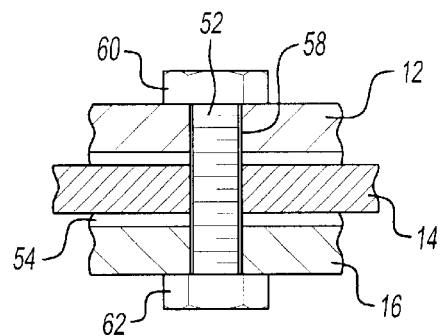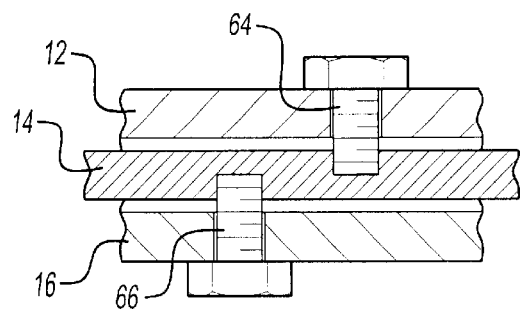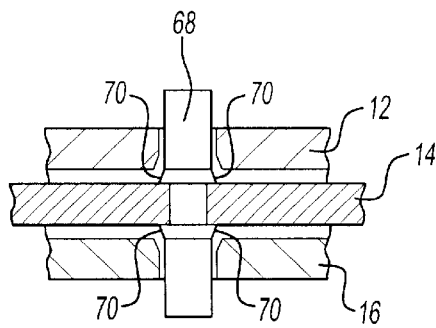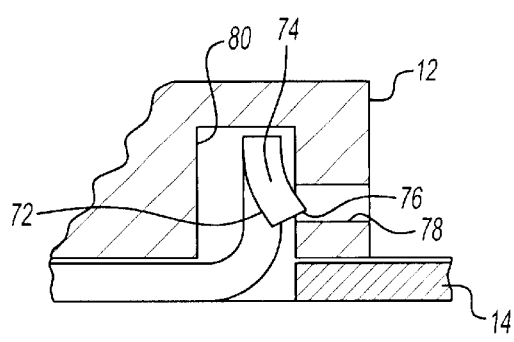

DOOR PANEL ASSEMBLY

This application claims priority to U.S. provisional application No. 60/188,973 filed on Mar. 10, 2000 and United Kingdom provisional application GB0024105.2 filed on Oct. 3, 2000.

The present invention relates to door panel assemblies and in particular door panel assemblies of land vehicles such as cars (automobiles).

Known cars include doors having windows. It is possible to lower and raise a window glass in order to open and close the window. The vertical position of the window glass is controlled by a window regulator, parts of which are generally secured to a lower edge of the window glass.

Several different forms of window regulator are known.

The window glass and window regulator are positioned in a cavity within the door and are attached to one side (the "wet" side) of a door panel. The window regulator is driven by components within a window regulator housing mounted on the wet side of the door panel.

A power mechanism is attached to the other side (the "dry" side) of the door panel opposite to, and in driving co-operation with the window regulator housing. The power mechanism can comprise a manual arrangement or a powered motor arrangement.

A problem with known door panel assemblies is to ensure alignment of the window regulator housing with the power mechanism.

An object of the present invention is to provide an improved form of alignment arrangement. A further object of the present invention is to provide a cheaper form of alignment arrangement.

Thus according to the present invention there is provided a door panel assembly including a door panel, a window regulator housing mounted on a first side of the door panel and a power mechanism mounted on a second side of the door panel, in which the panel includes at least one first alignment feature for aligning the window regulator housing relative to the door panel and at least one second alignment feature for aligning the power mechanism relative to the door panel.

The invention will now be described, by way of example only, with reference to the accompanying drawings in which:

FIG. 1 is a schematic view of a door panel assembly including a door panel, a window regulator housing, and a motor according to the present invention and FIGS. 2, 3, 4, 5 and 6 show differing methods of aligning the three components of FIG. 1.

FIG. 7 shows a method of fixing the door panel and window regulator housing of FIG. 1

With reference to FIG. 1 there is shown a door panel assembly 10 including a window regulator housing 12, a door panel 14 and a power mechanism in the form of a window regulator motor 16.

In further embodiments the power mechanism could be in the form of a manual window winder Door panel 14 can be in the form of a door inner skin, i.e. a pressed component having various holes and attachment features for components such as door hinges, door latch, audio speakers, window regulator motors etc.

Alternatively door panel 14 can be in the form of a door module panel i.e. a panel onto which is pre-mounted various components such as a window regulator motor, an audio speaker, a door latch etc. with this pre-assembled door module being mounted in a relatively large aperture of a door inner skin.

Window regulator housing 12 might typically contain a drum around which has being wound cable, rotation of the drum causing movement of the cable and hence raising or lowering of the window glass via separate components of the window regulator.

Note that the present invention is not restricted to window regulators containing drums with cables.

In particular it should be noted that the arrangement shown in FIG. 1 enables power generated by the window regulator motor 16 to be transferred across the door panel to the window regulator to enable raising and lowering of the window.

The three components shown in FIG. 1 can be aligned, according to the present invention, in various ways as shown in FIGS. 2 to 6. For ease of understanding, the reference numerals for the window regulator housing 12, door panel 14 and window regulator motor 16 of FIG. 1 have been used universally in FIGS. 2 to 6.

Consideration of FIG. 2 shows that the door panel 14 includes a pressed feature 18, in this case a frustoconical cone. Window regulator housing 12 includes a corresponding frustoconical recess 20 and motor 16 includes a corresponding frustoconical projection 22.

It can be seen that the engagement between recess 20 and the frustoconical cone 18 on the first side 24 of the door panel 14 provides alignment of the window regulator housing 12 with the door panel 14.

Furthermore it can also be seen that engagement between the frustoconical projection 22 and the frustoconical cone 18 on the second side 26 of the door panel 14 provides alignment between the motor 16 and door panel 14.

Thus by providing an accurate alignment method between the motor and door panel and by providing a further accurate alignment method between the window regulator housing and door panel, it is possible to accurately align the window regulator motor with the window regulator housing.

It can also be seen from FIG. 2 that the window regulator housing 12, door panel 14 and motor 16 each include a hole 28, 30 and 32 respectively through which passes a bolt 34, on the end of which is secured a nut 36. Tightening of the nut and bolt ensures that the window regulator housing, door panel and motor are tightly clamped together and the nut and bolt (together with other nuts and bolts) ensure that the window regulator housing, door panel and motor are fixed relative to each other.

In particular is can be seen that hole 30 is contiguous with the pressed feature (frustoconical cone 18).

A distinction should be made between those features which align the window regulator housing, door panel and motor (i.e. frustoconical cone 18, frustoconical recess 20 and frustoconical projection 22) and those features which secure the window regulator housing, door panel and motor relative to each other (i.e. the bolt 34 and nut 36 in conjunction with the holes 28, 30 and 32). In further embodiments it is possible to provide alignment feature, such as cones, conical recesses and conical projections, in the absence of fixing features such as holes. Such fixing features can be provided at other positions on the window regulator housing and motor.

In an alternative embodiment it is possible to use a screw which passes through hole 32 and hole 30 and is then screwed directly into the material of the window regulator housing 12. Alternatively a screw can pass through hole 28 and 30 and screw directly into the material of motor 16.

The alternative fixing features could secure both the window regulator housing and motor to the door panel.

Alternatively one set of fixing features can be used to secure the window regulator housing to the door panel and separate set of fixing features can be used to secure the motor to the door panel.

Thus FIG. 7 shows a door panel 14 having a tab 72 bent out of the general plane of the door panel. The tab 72 has a tang 74, with both the tab and tang being received in a recess 80 of the window regulator housing 12. End 76 of tang 74 engages a hole 78 which is contiguous with the recess 80 to ensure the window regulator housing 12 is fixed relative to the door panel 14. In this case other features of the door panel and window regulator housing provide for alignment of these two components.

Such an arrangement of fixing of the window regulator housing relative to the door panel means that the person assembly the various components can initially assembly the window regulator housing relative to the door panel and then subsequently, and without having to hold the window regulator housing in place, can assembly the motor onto the door panel. It is clear that a similar arrangement of fixings can be used to secure the door panel and window regulator motor.

In yet further embodiments a projection can be provided on the window regulator housing or motor which is inserted and cooperates with a hole in the door panel to fix the window regulator housing or window regulator motor relative to the door panel.

With reference to FIG. 3 there is a shown a door panel 14 in which tabs 38 and 40 have been bent of the general plane of door panel 14.

Tab 38 is received in recess 42 of the window regulator motor 16 and ensures alignment between the window regulator motor and the door panel 14.

Tab 40 is received in recess 44 of window regulator housing 12 and ensures alignment between window regulator housing 12 and the door panel 14.

In this case both tabs 38 and 40 are contiguous with a hole 46 in the door panel through which a bolt passes, which in conjunction with a nut 50 secures the window regulator housing, door panel and motor.

Consideration of FIG. 4 shows a dowel 52 which, in this case, is threaded along its whole length.

Note that in further embodiments it is possible to arrange the dowel to be only partially threaded, indeed the complete dowel can be absent of any threaded portions in order to provide alignment of the various components.

A mid portion 54 of dowel 52 is threaded into a corresponding threaded hole in the door panel 14 to secure the dowel 52 to the door panel 14. Holes 58 and 56 in window regulator housing 12 and motor 16 respectively pass over the appropriate ends of the dowel 52 to ensure that the window regulator housing and window regulator motor are aligned correct relative to the door panel 14.

In this case it can be seen that the dowel 52 is further utilised to secure the window regulator housing, door panel and motor since nuts 60 and 62 can be used to tighten the various components.

Consideration of FIG. 5 shows two distinct dowels 64 and 66 each been threaded on opposing ends with dowel 64 being used to both align and secure window regulator housing 12 relative to door panel 14 and with dowel 66 being used to both align and secure motor 16 relative to door panel 14.

Consideration of FIG. 6 shows a dowel 68 which has been secured to the window regulator housing 14 by a swaging technique wherein portions 70 of the dowel 68 have been plastically deformed in order that the panel 14 is clamped between these portions.

What is claimed is:

1. A vehicle door panel assembly comprising:

a door panel having opposing first and second sides;

a window regulator housing mounted to said door panel on said first side;

a power mechanism mounted to said door panel on said second side for driving a window regulator mounted within said window regulator housing;

at least one first alignment member located on said first side of said door panel for aligning said window regulator housing relative to said door panel;

at least one second alignment member located on said second side of said door panel for aligning said power mechanism relative to said door panel;

wherein said door panel includes a contiguous protrusion extending out from one of said first or second sides to form said first alignment member and wherein said protrusion forms a corresponding contiguous depression in the other of said first or second sides to form said second alignment member; and wherein one of said window regulator housing or power mechanism includes a recess and the other of said window regulator housing or power mechanism includes a projection wherein said protrusion is received within said recess and said projection is received within said depression, said protrusion being formed as a frustoconical cone with said recess and projection having corresponding frustoconical shapes.

2. A vehicle door panel assembly comprising:

a door panel having opposing first and second sides;

a window regulator housing mounted to said door panel on said first side;

a power mechanism mounted to said door panel on said second side for driving a window regulator mounted within said window regulator housing;

at least one first alignment member located on said first side of said door panel for aligning said window regulator housing relative to said door panel;

at least one second alignment member located on said second side of said door panel for aligning said power mechanism relative to said door panel;

wherein said door panel includes a contiguous protrusion extending out from one of said first or second sides to form said first alignment member and wherein said protrusion forms a corresponding contiguous depression in the other of said first or second sides to form said second alignment member;

wherein one of said window regulator housing or power mechanism includes a recess and the other of said window regulator housing or power mechanism includes a projection wherein said protrusion is received within said recess and said projection is received within said depression; and wherein said window regulator housing includes a first hole, said power mechanism includes a second hole, and said door panel includes a third hole extending through said protrusion wherein a fastener extends through said first, second, and third holes to clamp said window regulator housing, power mechanism, and door panel together.

3. A vehicle door panel assembly comprising:

a door panel having opposing first and second sides;

a window regulator housing mounted to said door panel on said first side;

a power mechanism mounted to said door panel on said second side for driving a window regulator mounted within said window regulator housing;

at least one first alignment member located on said first side of said door panel for aligning said window regulator housing relative to said door panel;

at least one second alignment member located on said second side of said door panel for aligning said power mechanism relative to said door panel;

a retaining member for fixing at least one of said window regulator housing or power mechanism to said door panel wherein said retaining member comprises at least one transversely extending tab contiguously formed with said door panel and wherein at least one of said window regulator housing or power mechanism includes a recess presenting an engagement surface, said tab grippingly engaging a portion of said engagement surface to secure said at least one of said window regulator housing or power mechanism to said door panel.

4. The door panel assembly as defined in claim 3 including a hole contiguously formed with said recess and wherein said tab includes a tang, said tang in gripping engagement within said hole to retain said at least one of said window regulator housing or power mechanism to said door panel.

5. A vehicle door panel assembly comprising:

a door panel having opposing first and second sides;

a window regulator housing mounted to said door panel on said first side;

a power mechanism mounted to said door panel on said second side for driving a window regulator mounted within said window regulator housing;

at least one first alignment member located on said first side of said door panel for said window regulator housing relative to said door panel; and at least one second alignment member located on said second side of said door panel for aligning said power mechanism relative to said door panel wherein said first alignment member comprises a first transversely extending tab contiguously formed on said first side of said door panel and said second alignment member comprises a second transversely extending tab contiguously formed on said second side of said door panel and wherein said window regulator housing includes a first recess, said first tab being received within said first recess to define said first alignment member, and wherein said power mechanism includes a second recess, said second tab being received within said second recess to define said second alignment member.

6. The door panel assembly as defined in claim 5 wherein said first recess presents a first engagement surface, said first tab in gripping engagement with said first engagement surface to secure said window regulator housing to said door panel and wherein said second recess presents a second engagement surface, said second tab in gripping engagement with said second engagement surface to secure said power mechanism to said door panel.

7. A vehicle door panel assembly comprising:

a door panel having opposing first and second sides;

a window regulator housing mounted to said door panel on said first side;

a power mechanism mounted to said door panel on said second side for driving a window regulator mounted within said window regulator housing;

at least one first alignment member located on said first side of said door panel for aligning said window regulator housing relative to said door panel;

at least one second alignment member located on said second side of said door panel for aligning said power mechanism relative to said door panel; and a first dowel having a first end in direct threaded engagement with said door panel and a second end extending out from said first side of said door panel; and a second dowel having a first end in direct threaded engagement with said door panel; and a second end extending out from said second side of said door panel wherein said first alignment member comprises said second end of said first dowel cooperating with said window regulator housing and said second alignment member comprises said second end of said second dowel cooperating with said power mechanism.

8. The door panel assembly as defined in claim 7 wherein said second end of said first dowel threadably engages said window regulator housing and said second end of said second dowel threadably engages said power mechanism.

9. A vehicle door panel assembly comprising:

a door panel having opposing first and second sides;

a window regulator housing mounted to said door panel on said first side;

a power mechanism mounted to said door panel on said second side for driving a window regulator mounted within said window regulator housing;

at least one first alignment member located on said first side of said door panel for aligning said window regulator housing relative to said door panel;

at least one second alignment member located on said second side of said door panel for aligning said power mechanism relative to said door panel; and a first dowel having a first end fixed to said first side of said door panel and a second end extending outwardly from said panel to form said first alignment member; and a second dowel having a first end fixed to said second side of said door panel and a second end extending outwardly from said panel to form said second alignment member.

* * * * *

UNITED STATES PATENT AND TRADEMARK OFFICE
CERTIFICATE OF CORRECTION

PATENT NO. : 6,684,568 B2
DATED : February 3, 2004
INVENTOR(S) : Blume et al.

It is certified that error appears in the above-identified patent and that said Letters Patent is hereby corrected as shown below:

Column 5,
Line 34, insert -- aligning -- before "said" and after "for".

Signed and Sealed this

Thirteenth Day of April, 2004

JON W. DUDAS
*Acting Director of the United States Patent and Trademark Office*